United States Patent
Blanco et al.

(10) Patent No.: US 10,167,202 B2
(45) Date of Patent: Jan. 1, 2019

(54) ENHANCED METAL RECOVERY THROUGH OXIDATION IN LIQUID AND/OR SUPERCRITICAL CARBON DIOXIDE

(71) Applicant: KING ABDULLAH UNIVERSITY OF SCIENCE AND TECHNOLOGY, Thuwal (SA)

(72) Inventors: Mario Blanco, Thuwal (SA); Ulrich Buttner, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 15/419,184

(22) Filed: Jan. 30, 2017

(65) Prior Publication Data

US 2017/0240434 A1    Aug. 24, 2017

Related U.S. Application Data

(60) Provisional application No. 62/298,536, filed on Feb. 23, 2016.

(51) Int. Cl.
  *C01G 49/00* (2006.01)
  *C01G 49/14* (2006.01)
  (Continued)

(52) U.S. Cl.
  CPC ............... *C01G 49/14* (2013.01); *C22B 1/11* (2013.01); *C22B 3/12* (2013.01)

(58) Field of Classification Search
  CPC .............. C01G 49/14; C22B 1/11; C22B 3/12
  (Continued)

(56) References Cited

U.S. PATENT DOCUMENTS

| | | |
|---|---|---|
| 4,030,917 A | 6/1977 | Fonseca |
| 4,338,199 A | 7/1982 | Modell |

(Continued)

FOREIGN PATENT DOCUMENTS

| | | |
|---|---|---|
| CN | 1683572 A | 10/2005 |
| CN | 1295363 C | 1/2007 |

(Continued)

OTHER PUBLICATIONS

CN-104060112A, abstract, Sep. 24, 2014. (Year: 2014).*

(Continued)

*Primary Examiner* — Steven J Bos
(74) *Attorney, Agent, or Firm* — Patent Portfolio Builders PLLC

(57) ABSTRACT

Process for enhanced metal recovery from, for example, metal-containing feedstock using liquid and/or supercritical fluid carbon dioxide and a source of oxidation. The oxidation agent can be free of complexing agent. The metal-containing feedstock can be a mineral such as a refractory mineral. The mineral can be an ore with high sulfide content or an ore rich in carbonaceous material. Waste can also be used as the metal-containing feedstock. The metal-containing feedstock can be used which is not subjected to ultrafine grinding. Relatively low temperatures and pressures can be used. The metal-containing feedstock can be fed into the reactor at a temperature below the critical temperature of the carbon dioxide, and an exotherm from the oxidation reaction can provide the supercritical temperature. The oxidant can be added to the reactor at a rate to maintain isothermal conditions in the reactor. Minimal amounts of water can be used as an extractive medium.

20 Claims, 1 Drawing Sheet

(51) Int. Cl.
 *C22B 1/11* (2006.01)
 *C22B 3/12* (2006.01)
(58) Field of Classification Search
 USPC .................................................. 210/758–763
 See application file for complete search history.

(56) References Cited

U.S. PATENT DOCUMENTS

| | | | |
|---|---|---|---|
| 4,438,077 A * | 3/1984 | Tsui | C01G 31/003 299/4 |
| 4,594,132 A | 6/1986 | Satchell, Jr. et al. | |
| 4,670,051 A | 6/1987 | Schneider | |
| 4,801,329 A | 1/1989 | Clough et al. | |
| 5,045,289 A | 9/1991 | Fernando et al. | |
| 5,106,513 A | 4/1992 | Hong | |
| 5,127,942 A | 7/1992 | Brierley et al. | |
| 5,176,802 A | 1/1993 | Duyvesteyn et al. | |
| 5,236,492 A | 8/1993 | Shaw et al. | |
| 5,603,750 A | 2/1997 | Sierakowski et al. | |
| 5,641,887 A | 6/1997 | Beckman et al. | |
| 5,730,874 A * | 3/1998 | Wai | B01D 11/0203 134/1 |
| 5,872,257 A * | 2/1999 | Beckman | B82Y 30/00 210/634 |
| 6,132,491 A | 10/2000 | Wai et al. | |
| 6,241,807 B1 | 6/2001 | Enick et al. | |
| 6,866,833 B1 | 3/2005 | Glennon et al. | |
| 6,905,531 B2 * | 6/2005 | Richardson | C02F 1/505 556/113 |
| 7,122,167 B2 | 10/2006 | Collard et al. | |
| 7,686,865 B2 | 3/2010 | Wai et al. | |
| 8,481,800 B2 | 7/2013 | Foster et al. | |
| 2002/0044899 A1 | 4/2002 | Marsden et al. | |
| 2003/0183043 A1 * | 10/2003 | Wai | B01D 11/0203 75/398 |
| 2003/0185733 A1 | 10/2003 | Collard et al. | |
| 2006/0133974 A1 | 6/2006 | Ji et al. | |
| 2008/0112864 A1 | 5/2008 | Lalancette | |
| 2008/0115627 A1 * | 5/2008 | Wang | B01D 11/0203 75/718 |
| 2008/0134837 A1 * | 6/2008 | Wai | C22B 3/02 75/396 |
| 2008/0286180 A1 | 11/2008 | Jones | |
| 2009/0038440 A1 | 2/2009 | Hamalainen et al. | |
| 2009/0074608 A1 | 3/2009 | Hillier et al. | |
| 2009/0226351 A1 | 9/2009 | Rosenberg | |
| 2010/0111751 A1 | 5/2010 | Hackl et al. | |
| 2010/0254870 A1 | 10/2010 | Foster et al. | |
| 2012/0328494 A1 | 12/2012 | Dreisinger et al. | |
| 2014/0230604 A1 | 8/2014 | Pavlovich et al. | |

FOREIGN PATENT DOCUMENTS

| | | | |
|---|---|---|---|
| CN | 1308470 C | | 4/2007 |
| CN | 104060112 | * | 9/2014 |
| WO | WO 2014/009802 | | 1/2004 |
| WO | WO 2009/109754 | | 9/2009 |
| WO | WO 2014/153672 | | 10/2014 |
| WO | WO 2014/195586 | | 12/2014 |

OTHER PUBLICATIONS

Recovering Refractory Resources, www.MiningMagazine.com, Sep. 2012.
Lowson, Richard T., "Aqueous oxidation of pyrite by molecular oxygen", Chemical Reviews, vol. 82, Oct. 1982.
Yunmei et al., "A kinetic study of the oxidation of arsenopyrite in acidic solutions: implications for the environment", Applied Geochemistry, vol. 19 (2004) pp. 435-444.

* cited by examiner

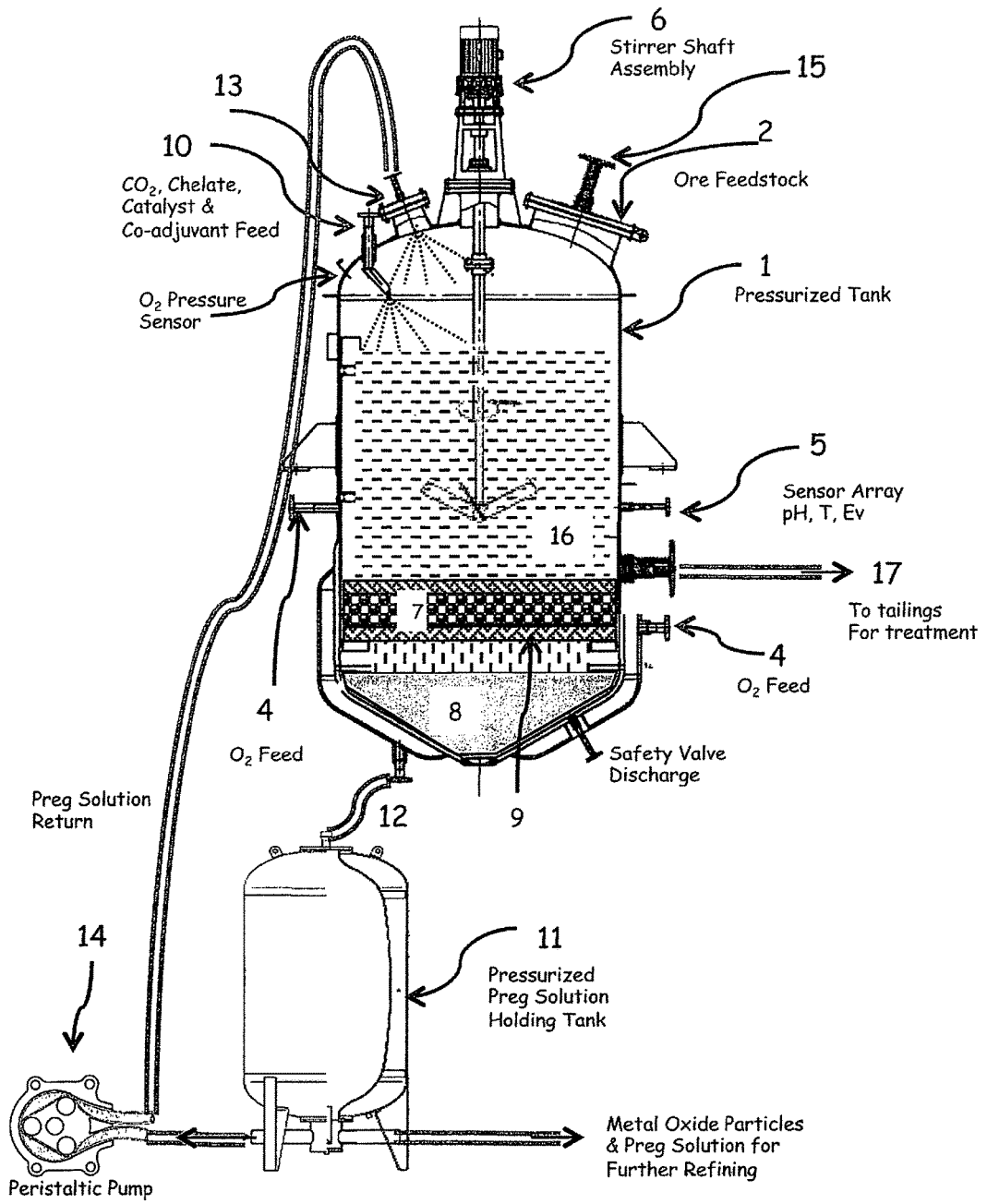

ENHANCED METAL RECOVERY THROUGH OXIDATION IN LIQUID AND/OR SUPERCRITICAL CARBON DIOXIDE

RELATED APPLICATIONS

This application claims priority to U.S. provisional application 62/298,536 filed Feb. 23, 2016, which is hereby incorporated by reference in its entirety for all purposes.

INTRODUCTION

Refractory ores are generally understood to mean difficult minerals and mineral aggregates for which traditional cyanide leaching fails, or partially fails, to recover a significant portion of the desired metal. Free-milling ores, on the other hand, usefully give 90% yields or more of the dispersed metal in the ore. Unfortunately, free-milling ores are being exhausted around the world at an ever-increasing rate. For example, in the case of gold, it is estimated that free-milling ore reserves may be exhausted in a few decades. A challenge is that at least half of the world's reserves of gold are embedded in refractory ores.

There are very many mining operations that use oxidation pretreatments (prior to cyanidation) for metal refining. The metals include precious metals such as gold, silver and platinum, and base metals (aluminum, copper, lead, nickel, tin, and zinc). These oxidation pretreatment methods can include: 1) high pressure oxidation (Pox), 2) high pressure acid leaching (HPAL), 3) biological oxidation (Biox), and 4) roasting. However, all of these methods require significant amounts of water and reagents and are highly energy intensive. See, for example, "Recovering Refractory Resources," MiningMagazine.com, September 2012.

Water oxidation is a common process in the prior art. Examples include U.S. Pat. No. 4,338,199 (oxidation of organic materials in supercritical water); U.S. Pat. No. 5,106,513 (oxidation above critical temperature but below critical pressure in water); U.S. Pat. No. 7,122,167 (oxidation of organics in precious metal organic compositions with supercritical water); U.S. Pat. No. 8,481,800 (aqueous phase oxidation process where carbon dioxide a reaction product); CN 1308470 (1683573) (uses ultrafine grinding with supercritical water and oxidant); and US Patent Publication 2009/0226351.

Another approach used in the prior art is specially designed metal-binding compounds (called, for example, extractants, ligands, or complexing agents). Examples include U.S. Pat. Nos. 5,641,887 and 6,241,807 (use of extractant with $CO_2$-philic groups to move metal from aqueous phase to supercritical fluid carbon dioxide phase; but no oxidant or oxidation of metal); U.S. Pat. No. 7,686,865 (use of acid-base complex of oxidizing agent and complexing agent); U.S. Pat. No. 6,866,833 (thiourea complexing agent); and WO 2009/109754 (perfluorinated phosphine chelator). Many of these complexing agents are detrimental to the environment.

Another approach used in the prior art is use of supercritical carbon dioxide as a reactant rather than a solvent. See, for example, U.S. Pat. No. 5,045,289 (converting rare earth oxide or hydroxide to carbonate with supercritical fluid carbon dioxide; no oxidant used); and WO 2014/009802 (convert magnesium silicate with iron to magnesium carbonate without iron in supercritical fluid carbon dioxide).

A need exists for more efficient, more environmentally friendly, and safer metal recovery processes which use less water, energy, and toxic complexing agents.

SUMMARY

Provided herein are methods of processing metal-containing feedstocks as well as systems for carrying out such processing.

For example, a first aspect provides for a method comprising: oxidizing a metal-containing feedstock in a reactor with liquid and/or supercritical fluid carbon dioxide and at least one oxidant, wherein optionally the oxidant is free of complexing agent and optionally the metal-containing feedstock is not subjected to ultrafine grinding.

A second aspect provides for a method comprising: oxidizing a metal-containing feedstock in a reactor with liquid and/or supercritical carbon dioxide and at least one oxidant, and the metal-containing feedstock is not subjected to ultrafine grinding.

A third aspect provides for a method comprising: oxidizing a metal-containing feedstock in a pressurized reactor with liquid and/or supercritical fluid carbon dioxide and at least one oxidant, wherein the metal-containing feedstock is a mineral metal composition, wherein optionally the oxidant is free of complexing agent, and optionally the metal-containing feedstock is not subjected to ultrafine grinding.

A fourth aspect provides for a method comprising: oxidizing a metal-containing feedstock in a pressurized reactor with liquid and/or supercritical fluid carbon dioxide and at least one oxidant, wherein the metal-containing feedstock is a waste composition, wherein optionally the oxidant is free of complexing agent, and optionally the metal-containing feedstock is not subjected to ultrafine grinding.

In one embodiment, for example, the metal-containing feedstock is a mineral metal composition. In one embodiment, the metal-containing feedstock is a refractory mineral composition. In one embodiment, the metal-containing feedstock is a mineral metal composition comprising a high sulfide content. In one embodiment, the metal-containing feedstock is a mineral metal composition comprising a high carbonaceous material content. In one embodiment, the metal-containing feedstock is a mineral metal composition comprising a high sulfide content or a high carbonaceous material content.

In one embodiment, the metal-containing feedstock is a waste composition. In one embodiment, the metal-containing feedstock is an electronic waste composition.

In one embodiment, the oxidant is oxygen, air, ozone, hydrogen peroxide, nitric acid, or combinations thereof. In one embodiment, the oxidant is oxygen.

In one embodiment, aqueous alkali solution is also added to the reactor.

In one embodiment, oxidizing the feedstock is carried out with supercritical fluid carbon dioxide.

In one embodiment, an oxidation catalyst is used.

In one embodiment, the oxidizing of the feedstock is carried out at a temperature of about 600° C. or less. In one embodiment, the oxidizing of the feedstock is carried out at a temperature of about 100° C. or less.

In one embodiment, the oxidizing of the feedstock is carried out at a pressure of about 400 bar or less. In one embodiment, the oxidizing of the feedstock is carried out at a temperature of about 120 bar or less.

In one embodiment, the oxidizing of the feedstock is carried out at a temperature of about 600° C. or less and at a pressure of about 400 bar or less.

In one embodiment, the metal-containing feedstock is fed into the reactor at a temperature below the critical temperature of the carbon dioxide, and an exotherm from the oxidation reaction provides the supercritical temperature.

In one embodiment, the oxidant is added to the reactor at a rate to maintain isothermal conditions in the reactor.

One or more advantages can be achieved in at least some of the embodiments described herein. For example, in at least some embodiments, metal recovery yields can be improved. Also, in at least some embodiments, larger savings in water consumptions can be achieved compared to standard high-pressure water oxidation and related methods. Also, because the process operates close to room or ambient temperature (25° C.), significant energy savings can be realized in at least some embodiments. Other advantages for at least some embodiments include improved safety and less use of toxic chemicals. Another advantage for at least some embodiments is that complexing agents are not added, although in some cases a complexing agent may form in the oxidation process.

Other advantages for at least some embodiments noted below include, for example, more friendliness to the environment such as "green discharges" through control of oxidation products that minimize leaching. Other advantages for at least some embodiments include the formation of thiosulfates, through controlled oxidation, which can act as in-situ generated chelating agents for the recovery of precious metals. Other advantages for at least some embodiments include the in-situ generation of ammonium thiosulfate suitable for use as fertilized discharge tailings where crops and/or green landscapes can be planted. Other advantages for at least some embodiments include the selection of a specific metal, such as Au or Pt, for leaching during oxidation through relatively small amounts of added water alkali solution in the presence of ammonium hydroxide. Other advantages for at least some embodiments include a significant elimination of acid discharges, such as sulfuric acid, by oxidation yielding iron sulfate as a final product in a near waterless (dry) working slurry. Other advantages for at least some embodiments include high efficiency mixing of oxidant with metal-containing feedstock through the use of a high fluidity supercritical carbon dioxide fluidized bed. Other advantages for at least some embodiments include a higher slurry solid content than it is possible in water because of the higher density of liquid carbon dioxide. Other advantages for at least some embodiments include the use of substantially lower critical temperatures and pressures which contribute to lower costs and the safer operation of high pressure oxidation equipment.

BRIEF DESCRIPTION OF DRAWINGS

FIG. 1 illustrates one embodiment of a reactor for carrying out the methods described and/or claimed herein.

DETAILED DESCRIPTION

Introduction

The various elements summarized above and claimed below are described in more detail.

US priority provisional application 62/298,536 filed Feb. 23, 2016 is hereby incorporated by reference in its entirety for all purposes.

As appropriate, an open transition such as "comprising" can be replaced with the transition "consisting essentially of" or "consisting of." The application as filed describes basic and novel features of the claimed inventions.

References cited herein are incorporated herein by reference in their entirety.

For embodiments described herein, wherein one or more elements are described as optional, other embodiments are necessarily described wherein these optional elements are present.

Metal-Containing Feedstock

The methods described and claimed herein can be applied to at least one metal-containing feedstock. This material can be derived from raw material from nature or it can be man-made. It can be partially processed by men before carrying out the methods described herein. The feedstock can be inorganic, organic, and mixtures of organic and inorganic materials. In some embodiments, mixtures (including physical mixtures) of metal-containing feedstocks, including raw materials from nature can be used. One or more processing steps can be used to extract materials from nature and preparing the extracted materials for further processing. The metal-containing feedstock, including raw material from nature, can be a solid material in particle form. However, the metal-containing feedstock does not need to be ground with ultrafine grinding so that submicron or nanometer scale particles are formed. The average particle size in the present process can be, for example, about 20 microns to about 50 microns (Tower Mill), or about 50 microns to about 150 microns (Ball Mill) with milling power intensities between 20 to 40 kW/m$^3$ as compared with 280 kW/m$^3$ in Ultra Fine Grinding (UFG) milling. U.S. Pat. No. 6,132,491 describes a process in which metal compounds are converted to metal particles, optionally with use of an oxidizing agent, but presently there is no requirement that the metal compounds are converted to particles.

The metal-containing feedstock, e.g., raw material from nature, can be an ore including a mineral ore.

The amount of metal in the metal-containing feedstock is not particularly limited but can be, for example, at least about 0.5 ppm, or at least 5 ppm, or at least 50 ppm, including the content when the metal is gold. As known in the art, the metal content of ores for base and precious metals can vary by several orders of magnitude and still be commercially exploitable, depending on the nature of the metal. Similarly, e-waste can be significantly higher in precious metal concentration than any naturally occurring ore.

In one embodiment, the metal-containing feedstock, such as the raw material from nature, can be a refractory ore. Refractory ores are generally understood to mean minerals and mineral aggregates for which traditional cyanide leaching fails, or partially fails, to recover a significant portion of the desired metal. For example, the metal yield might be less than 90%, or less than 80%, or less than 70%, or less than 60%, or less than 50%. A traditional cyanide method includes the MacArthur-Forrest process including Carbon in Pulp (CIP), Carbon in Leach (CIL), Carbon in Column (CIC), and Heap Leaching.

In one embodiment, an ore with high sulfide content can be used wherein the desired metal is entrapped and difficult to leach out by traditional cyanidation without oxidation of the surrounding mineral gangue. Oxidation of this kind of ore is a necessary step to release the entrapped metals and enhance the metal recovery yields. In the present process, sulfide can be converted to thiosulfate with use of a base such as ammonium hydroxide in water solution.

In one embodiment, an ore can be used which is rich in carbonaceous materials, which rob the cyanide-leaching agent, trapping the released metal into the carbonaceous material. This can be called "preg-robbing" as known in the art. Oxidation of this kind of ore is a necessary step to release the entrapped metals and enhance the metal recovery yields. In one embodiment, thiosulfate can be used for the treatment of oxidized refractory carbonaceous (doubly refractory) mineral ores.

Examples include base or precious metals which can be as compounds or complexes in mineral gangue.

More examples include sulfur rich minerals such as, for example, Arsenopyrite FeAsS, pyrite $FeS_2$, Pyrrhotite $Fe_{1-x}S$ (x=0 to 0.2), Chalcopyrite $CuFeS_2$, Acanthite $Ag_2S$, Chalcocite $Cu_2S$, Bornite $Cu_5FeS_4$, Galena PbS, Sphalerite ZnS, Chalcopyrite $CuFeS_2$, Millerite NiS, Pentlandite $(Fe, Ni)_9S_8$, Covellite CuS, Cinnabar HgS, Realgar AsS, Orpiment $As_2S_3$, Stibnite $Sb_2S_3$, Pyrite $FeS_2$, Marcasite $FeS_2$, and Molybdenite $MoS_2$. More examples include Pyrargyrite $Ag_3SbS_3$ and Proustite $Ag_3AsS_3$. More examples include carbonaceous preg-robbing materials such as carbonates, carbon, and graphitic minerals. Other examples include elemental sulfur, or a multitude of other unfavorable constituents including tellurides, antimony, and arsenic.

The metal which is the subject of recovery can be, for example, one or more of the platinum group metals (Ru, Rh, Pd, Os, Ir, Pt), precious metal group (Au, Ag), or base metal (Al, Cu, Pb, Ni, Sn, Zn). In addition, the metal can be, for example, tungsten, molybdenum, tantalum, cobalt, bismuth, cadmium, titanium, zirconium, antimony, manganese, beryllium, chromium, germanium, vanadium, gallium, hafnium, indium, niobium, rhenium, or thallium.

In addition, the metal can comprise on or more rare earth elements including, for example, cerium, dysprosium, erbium, europium, gadolinium, homium, lanthanum, lutetium, neodymium, praseodymium, promethium, samarium scandium, terbium, thulium, ytterbium, or yttrium.

In one embodiment, the feedstock is not the feedstock described in WO 2014/009802, which describes use of magnesium silicate feedstocks and magnesium silicate feedstock containing iron.

Another embodiment relates to treatment of waste as metal-containing feedstock with carbon dioxide (liquid and/or supercritical) rather than raw material derived from nature or an ore. In this embodiment, the waste can be, for example, organic industrial or municipal waste, "eWaste" (electronic waste, and in general waste from electrical and electronics equipment (WEEE). WEEE includes, for example, various kinds of discarded electronic equipment, typically containing significant amounts of gold, copper, silver, and rare elements in high concentrations, even when compared to mine ores.

Typically eWaste and/or WEEE includes metal inks applied to the surface of electronic boards. These inks, so called interconnects, can contain high levels of gold, silver, and copper. The surfaces may be exposed or covered with protective layers. In addition, ewaste and/or WEEE materials may contain a large number of rare-earth elements, particularly when combined with high power magnetic materials. These can have high recovery value. Electrical waste, from large-sized pieces of equipment, such as refrigerators, washing machines, air conditioners and CRT TVs, for example, may be considered as the most important sources of base metals (Al, Cu, Fe, Pb, Sn and Zn). On the other hand, eWaste and/or WEEE from small devices, such as personal computers, mobile phones, video game consoles and digital devices are being considered as important sources of precious metals (Ag, Au and Pd), while mid-size information and communication technology (ICT) equipment (e.g., printers and fax machines) are an important source of a variety of less common metals (Ba, Bi, Co, Ga, Sr and Ta).

These electronic waste materials do not typically contain sulfides or the typical gangue matrices but may require oxidation of the surrounding electronic packaging (organic and inorganic resins) to be extracted. Fine grinding may in some cases be necessary to access these elements. However, with supercritical carbon dioxide, this is not as critical since its fluidity (ability to flow through pore spaces) is very high, about 10 times higher than water.

Pyrometallurgy, high temperature processing, can be used to chemically convert the feed materials and to separate metals and impurities into different phases so valuable metals can be recovered. In hydrometallurgy, strong acidic or caustic aqueous solutions can be used to selectively dissolve or precipitate metals, which can later be recovered by precipitation, cementing, and solvent extraction, among others. In electrometallurgy, electrical currents can be used to recover metals, e.g., electrowinning of copper and zinc.

Mixtures and alloys of metals can be present.

Minerals recovered from deep sea mining can be quite different mineral ores from land base mines. Deep sea mining takes place aggressively on the ocean floor around large areas of polymetallic nodules or active and extinct hydrothermal vents. These vents can create sulfide deposits which can contain valuable metals such as silver, gold, copper, manganese, cobalt and zinc. The deposits can be brought to the surface for processing by hydraulic pumps. Researchers have found large untapped sources of rare earth elements in deep ocean floors. Oxidation of these minerals with supercritical carbon dioxide oxidation may be necessary if sulfide gangue is present.

Liquid and/or Supercritical Fluid Carbon Dioxide; Solvent

In this context, water and carbon dioxide are not equivalent for an oxidation medium. The use of carbon dioxide provides a variety of advantages compared to the use of, for example, water, including supercritical water. For example, the lower critical temperature provides for lower energy usage. Also, oxygen is much more soluble in carbon dioxide compared to water (e.g., 10-30% molar compared to less than 0.01% molar) which provides for higher degrees of oxidation. In addition, carbon dioxide is generally in this context an environmentally friendly, non toxic, non flammable solvent and is easy to reuse. Also, with carbon dioxide, oxidized mineral discharges can be close to dry, devoid of aqueous discharge.

The use of minimal amounts of water in the processing of natural mineral ores, or eWaste, can be termed "Xerometallurgy."

The phase boundaries for liquid and supercritical carbon dioxide are known. For example, the supercritical point of pure carbon dioxide is about 31.1° C. and about 73.9 bar.

In one embodiment, no fluorinated and/or perfluorinated solvent is used. In one embodiment, no fluorinated and/or perfluorinated compound is used such as a fluorinated and/or perfluorinated complexing agent or solvent. For example, WO 2009/109754 requires use of perfluorinated phosphines, and U.S. Pat. No. 6,866,833 requires use of fluorinated thiourea complexing agent.

The focus also is use of carbon dioxide as a solvent to generate, for example, a fluidized bed where oxidation can take place more readily. Some organic material present in the reactor might be converted to carbon dioxide, but this role of carbon dioxide is different than the use of carbon dioxide as a fluidized bed solvent. In addition, some carbon dioxide might react with some material in the feedstock, but the focus here is use of carbon dioxide as a fluidized bed solvent, not a reactant. In particular, the targeted metal does not react with carbon dioxide.

Supercritical fluid carbon dioxide is particularly preferred due to its high fluidity, low viscosity value compared to water (0.02 cp versus 1.02 cp, a factor of 50). A fluidized bed can be formed when a quantity of a solid particulate substance (the mineral ore or eWaste) is placed under appropriate conditions to cause a solid/fluid mixture to behave as a fluid. This is usually achieved by the introduction of pressurized fluid through the particulate medium, wherein in this case the fluid is supercritical carbon dioxide. The fluidized bed allows for the oxidant, say oxygen, to access the surface of all particles and cause oxidation. In addition, the critical density of (0.469 g/cc) of carbon dioxide is larger than the critical density of water (0.322 g/cc), which allows higher slurry densities to be suspended in the fluidized bed, allowing up to 45% more metal feedstock to be processed in the same volume of fluid. Finally, an oxidant such as molecular oxygen is completely miscible in supercritical and liquid carbon dioxide whereas liquid water at similar temperatures (30-40° C.) can only hold 6-8 parts per million (6-8 mg/l) of oxygen. This is one reason why very high pressures (in excess of 200 bar) are required with water as a medium for effective oxidation.

Oxygen can have a dramatic effect on the critical pressure of supercritical carbon dioxide. For instance, molar fractions in excess of 30% can lower the supercritical temperature form 31.1° C. to below 0 degrees. Although the exothermicity of the oxidation of sulfides can elevate the temperature, molar fractions of oxygen below 30% can be used. More favorably, 10-20% partial pressures of oxygen can yield optimal oxidation at lower costs, while maintaining operating conditions above room temperature for more favorable oxidation kinetics.

Oxidant

Oxidants for metals are known in the art and one or more oxidants are fed into the reactor. For example the oxidant can be a gaseous oxidant such as gaseous oxygen or a liquid oxidant such as liquid oxygen. Other examples of oxidant include air (including compressed air), ozone, hydrogen peroxide, and nitric acid.

For mineral ores, the amount of oxidant which is sufficient to oxidize the gangue surrounding the metal and can be estimated, for example, as a multiple of the amount of sulfide contained in the mineral ore. In the case of pyrite for example, according to the reaction;

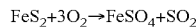

$$FeS_2 + 3O_2 \rightarrow FeSO_4 + SO_2$$

3 moles of oxygen are required for each mole of pyrite to yield a stable iron sulfate waste product. In general, a mole of oxygen is required to oxidize 2 moles of sulfide, $S^{2-}$.

The oxidant can be used without use of a carrier or a complexing agent (as described in, for example, U.S. Pat. No. 7,686,865).

Ozone, locally produced by known electrical methods, and hydrogen peroxide can also be used as oxidant.

Water

Water also can be present and fed into the reactor. The water can extract the oxidized metal phase. The water can be in different forms with different pHs. For example, it can be an alkaline solution. It can be in continuous or discontinuous flow. It can be in spray form. For example, a minimal amount of aqueous alkali solution can be added to the slurry in the reactor to achieve water saturation levels without excess water.

In one embodiment, during oxidation, a continuous amount of aqueous alkali solution can be added at the head of the pressure reactor through, for example a nozzle, and collected at the bottom of the reactor to avoid an excess in the working pulp.

In one embodiment, the recovered alkali solution can be recycled at the top of the reactor.

In general, minimal water is desirable, for example, 0.5 to 10 liters, or about 2.5 liters, of water per actual cubic meter of working slurry in the entire reaction mixture. Typically, water pH will be adjusted at values above pH 10, preferably pH 11-12, or above with lime or other base. Added water temperatures should be above the supercritical point of carbon dioxide at the operating pressure. In one embodiment, water is added as water vapor, prior to ingress into the reactor.

The supercritical point of water is about 374° C. and about 221 bar. The water can be used below its critical temperature and/or pressure.

Water has been identified as having a catalytic effect on pyrite oxidation (e.g., "Thermal Gravimetric Analysis of Pyrite Oxidation at Low Temperature", J. E. Pahlman and G. W. Reimers, Bureau of Mines Report of Investigations, 9059, 1986). These studies found that for their particular focus a minimum of 20% by volume water vapor was required to produce any measurable oxidation. These studies, however, were conducted on small samples, without a fluidized bed and at atmospheric pressures. It can be estimated that this amount can be an upper limit to the necessary amount of any necessary water vapor to be required as a catalyst or as a pure metal extraction medium. In the claimed inventions, one seeks to get the water condensed inside the reactor, and it does at the conditions of supercritical and liquid carbon dioxide under consideration. Due to its higher density, water should percolate down to the bottom where it can be continuously collected. Some irreversible moisture adsorption might be inevitable, but this should be small for high sulfide (hydrophobic) containing mineral ores and feedstocks.

Other Components

Besides the metal-containing feedstock, carbon dioxide, and oxidant, other components can be present including water as noted above. For example, an oxidation catalyst can be used. For example, an oxidation catalyst with or without co-adjuvant can be added continuously or intermittently at the head of the pressure reactor through a nozzle. Examples of oxidation catalysts include iron nanoparticles. The amount of oxidation catalyst can be, for example, 0.05 wt. % to 2 wt. %, or 0.1 wt. % to 1 wt. %.

Externally added complexing agents and/or chelators can be avoided. However, self-generated, in-situ, complexing agents and/or chelators can be used. Any externally added complexing agent can add significant cost to the operations. Typically, these added chelating or complexing agents are at 1:1 or even 2:1 (chelator:metal atom) ratios, which makes them uneconomical to be added in pre-treatment. Concentration of pre-treated ore is required to reduce the cost. For example, in-situ thiosulfate generation can be carried out through the proper oxidation conditions (mainly temperature, oxidation concentration and total humidity)

Reactor and Oxidizing, Mixing, Contacting Steps

In the reactor, water can act as both a catalyst as well as an extracting agent. Gravity can be used instead of counterflow as in U.S. Pat. No. 7,686,865, which formally uses a stripping process. Stripping is a physical separation process where one or more components are removed from a liquid stream by a vapor stream. In industrial applications, the liquid and vapor streams can have co-current or countercurrent flows. Presently, one can use only liquids or supercritical fluid but not vapor streams as U.S. Pat. No. 7,685,865 may imply. Stripping is usually carried out in either a packed or trayed column.

The oxidizing step can be associated with a mixing and/or contacting step and can be carried out in a reactor which allows for pressure and temperature control which allows for phase control. Fluid containment is provided. As known in the art, the reactor is adapted so that materials can enter the reactor and exit the reactor. Recovery and recycling can be carried out. Sensors and sensor arrays can be used on the reactor. Pumps can be used. Devices for providing agitation such as stirrers and stirring shafts can be used.

The reactor can be adapted for batch, semi-batch, or continuous operation.

A single reactor can be used. In one embodiment, one can exclude use of two or more reactors or multiple stations. In other embodiments, however, one can use two or more reactors or multiple stations. In one embodiment, the process is not a countercurrent process.

In one embodiment, the process is made continuous by connecting individual reactors in series. For example, supercritical carbon dioxide can be vented from an already treated reactor into the next reactor, reducing the energy to recompress carbon dioxide to supercriticality. Similarly, the extracted aqueous phase can be reused in the second reactor, increasing the metal concentration as the solution passes from one reactor to the next.

Any supercritical reactor or reactor assembly must be engineered to withstand temperature and pressures well in excess of the supercritical point. Although the material cost of plant to carry out the process, including special high-pressure pump and valves, is intrinsically higher than non-pressurized tanks, e.g., cyanidation tanks, but lower than pressurized supercritical water tanks, the fact that the process is simple and effective in oxidizing the ore, combined with low operating costs and low losses of material, makes the process economical. Furthermore, supercritical carbon dioxide conditions are much milder than high-pressure water oxidation, the common standard in the treatment of refractory metal ores. The minimal use of water increases oxidation and, for some sulfur embodiments, reduces the formation of sulfuric acid in favor of iron sulfate which is a "greener" discharge product.

The supply of gaseous oxidant can be done at the bottom inlet of a tank pressure reactor. The reactor may have been previously filled with carbon dioxide at, near, or in excess of supercritical pressures. The total oxidant pressure can be adjusted so that the carbon dioxide becomes supercritical at the reactor temperature.

Alternatively, oxidant may be supplied after supercriticality has been achieved inside the reactor, and supplementary oxidant can be supplied at one or more points along the length of the reactor. For example, supplementary oxidant may be fed into the reactor at the top or near a feedstock injection point.

The order of adding components to the reaction fluid can be important. For example, gas components can be added to the dry particles premixed with a minimal amount of water to achieve water saturation levels without excess water. Water may be added at a temperature such that the resulting mixture is close to the supercritical carbon dioxide temperature. In one embodiment, for example, oxidant, catalyst and coadjuvant can be added as the first step in a multi-step process to favor driving the oxidant deep into the metal feedstock particles prior to the addition of carbon dioxide. In one embodiment, for example, a full cycle of oxidant, catalyst and coadjuvant followed by carbon dioxide is followed by release of carbon dioxide from the reactor and a new cycle of oxidant, catalyst and coadjuvant followed by carbon dioxide is initiated. In one embodiment, one to five cycles may be used for complete metal feedstock oxidation.

After adding oxidant, the heat of reaction might be sufficient to raise the temperature to or higher than the critical temperature. The flow of oxidant can be carefully controlled to operate as closely as possible under isothermal conditions. Other water components may also be premixed with one or more of the reaction mixture components. These include alkali, to adjust the pH, chelating agents to carry out the oxidized metal, and catalysts and co-adjuvants to speed the oxidation kinetics.

The process is suitably carried out at temperatures in the range from, for example, 20° C. to 600° C., or 20° C. to 400° C., preferably 31° C. to 220° C. The starting temperature can be below 31.1° C. The oxidation process described herein can be exothermic. A temperature rise can be observed in some embodiments. The temperature rise can be, for example, 150° C. or more. For context, a prior art roasting process can be at temperatures much higher, e.g., 500° C. to 700° C.

In one embodiment, the mineral mixture composition is fed at a temperature below the critical temperature of carbon dioxide into the reactor, and the exotherm from the oxidation provides supercritical temperature.

In one embodiment, the oxidant is added at a rate to maintain isothermal conditions in the reactor.

A pressure from about 70 bar to about 400 bar, preferably at a pressure of 72 bar to 120 bar. There can be a pressure drop across the length of the reactor, dependent upon the individual reactor design.

Although it is preferred to operate a continuous process, the presently claimed inventions may be more easily operated as a batch process. The quantity of oxidant used is such as to achieve sufficient oxidation of the mineral feedstock under the reaction conditions, to liberate the maximum possible amount of metal. The amount of oxidant can be suitably adjusted by feedback from sensors at the head of the pressurized reactor tank, which under ideal reaction conditions should show constant free oxidant concentrations in the presence of carbon dioxide and any gas reaction products. Desirably, although not necessary, is that the total quantity of used oxidant is such that all mineral gangue material, where metal is embedded, is thoroughly oxidized. In one embodiment, the oxidant is suitably supplied from a tank of liquid oxygen or pressurized air. It is possible to use a mixture of oxygen with one or more inert gases, but at present, this is preferably not used.

If desired, the reactor can be insulated. By using conventional heat exchangers to manage heat in the various inlet and/or outlet streams, it is normally possible to make the whole process operate under isothermal conditions, i.e., without the addition of an external heat source. Indeed, a part of the heat generated in the process can be used to produce for example high pressure steam that can be used to pre-treat the incoming feedstock ore.

A full-scale plant may suitably be operated with a control unit that monitors, for example, the oxidant (e.g. oxygen) being consumed during the reaction, pH and other variables. The oxygen can be fed at a rate to ensure that there is a vigorous controlled oxidation throughout the reactor without run away reactions.

The processes described herein are preferably carried out on planet earth and not away from the earth such as another planet, e.g., Mars.

Output, Recovery of Metal

The outputs of the process can be finely divided metal or metal oxide particles in an aqueous slurry or solution. The output slurry or solution may preferably be continuously separated from the working pulp, and stored separately for further refining. For that purpose, a screen filter can be located at the bottom of the reactor to allow only the heavier aqueous solution containing the oxidized metal slurry to drip out of the working volume, while keeping the working pulp solid particles in liquid or supercritical carbon dioxide/oxidant mixture. The output slurry or solution may also be recycled to the head of the tank to increase metal concentrations by way of reducing the working solution volumes even further.

In some embodiments, a reducing agent or electrowinning can be used in the final concentrate to recover the extracted metal. In one embodiment, cyanide can be used as a strong complexing agent in the final aqueous concentrate to isolate a specific metal. A reducing agent or electrowinning can then be used in the cyanidation concentrate to recover the specific metal.

The slurry also can contain other by-products of the oxidation reaction, dependent upon the actual initial chemical composition of the feedstock mineral composition. Carbon dioxide creates a carbonic acid solution in water after pressure let down. Some insoluble metal carbonate may be formed. Furthermore, if there is phosphorous or sulfur present in the miner feedstock, the product may contain phosphoric acid and sulfuric acid respectively. Such acid may be neutralized, by further addition of alkali such as lime, prior to further refining or recovered as a by-product. Generally, however, neutralization can be conducted continuously in the supercritical working pulp mass by additional alkali. pH must be monitored constantly and kept high, around pH 12 to prevent the passivation of the mineral ore particle surface by the oxidized products.

An externally added chelating agent can be included in the reactor including in the alkali aqueous solution to help maintain the liberated oxidized metal in solution. Additionally, one or more catalysts and co-adjuvants may be added to the aqueous alkali solution to make the oxidation even more vigorous.

In one embodiment, the metal is not in the process described herein forming particles, as described in, for example, U.S. Pat. No. 6,132,491.

The metal component of the feedstock mineral may be the only metal present, or other metals may be present either as major components or as contaminants. The metal, metal carbonate, or metal oxide may be separated from such contaminant metal oxides by conventional processing.

Illustrated Embodiment

FIG. 1 illustrates one embodiment of a reactor for carrying out the claimed method. Equivalents and variants of the illustrated embodiments can be used.

In this embodiment, high pressure reactor (1) is fed with pulp, dry or wet ore stream through a door mounted plate assembly (2), carbon dioxide is pumped at a pressure near or in excess of the critical pressure, a variable amount of oxidant which may consist of air, oxygen, ozone, or acid solution is fed at the bottom and sides of the reactor (4), electrochemical potential, pH, and reactor temperature are monitored at the mid-section of the reactor (5) while total and $O_2$ pressure is monitored at the head of the reactor. The amount of alkali aqueous solution and $CO_2$ is adjusted to create a fluidized bed and the reactor contents are mechanically stirred with an electrically or magnetically operated shaft and impeller assembly (6). A filter (7) is placed between the working pulp and the solution collector chamber (8) suspended between two metal screens (9). Aqueous solution containing alkali plus catalyst and co-adjuvant is fed as a high pressure mist at the reactor head by a nozzle (10) in sufficient amount to create a constant flow of pregnant solution which is collected into a secondary holding tank (11) for further processing, through line valve (12), or recycled back to the head space of the pressure tank (13) by a peristaltic pump (14). In batch mode operation, after oxidation is complete, all $CO_2$ and reaction produced gases, in excess of a few atmospheres, are collected at the tank head and sent to a $CO_2$ purification unit for compression and storage through line (15) which also collects excess pressure of gases, e.g. $O_2$, $N_2$, $CO_2$ and the like which are taken off through this line. After significant pressure let down, the working pulp (16) tailings are pumped out of the reactor tank using the remaining internal pressure, a few bar, for further treatment through exit line valve (17).

It should be understood that the drawing and the above specific description, relates to a batch mode of operation. The skilled in the art will understand that the invention may be operated in a semi-batch and/or continuous modes. The metal ore feedstock may be fed continuously by controlling the pressure in the secondary holding tank (11) and the opening state of exit line valve (17) to create suitable semi-batch and continuous operation conditions.

The oxidized metal pregnant solution tends to be in finely divided particles. A portion of these solids may accumulate in filter component (7) where they may be easily recovered. The solids may then be separated and subjected to such further treatment or refining as is necessary or desirable and the pregnant solution liquid can be processed through commonly used refining methods.

Additional embodiments are provided in the following examples.

EXAMPLES

Example 1

1 kg of arsenopyrite (80%—200 mesh) ore is placed in a high-pressure reactor and 0.2 liters of alkaline (29 g/L NaOH) solution is added. The reactor is pressurized with liquid carbon dioxide until it reached a pressure of 65 bar. The pulp is stirred at 100 rpm. Oxygen is added at the rate of 1 liter/min until the oxygen over pressure varies between 7 and 15 bar. The reactor working pulp temperature is monitored until it reached 32° C. and the flow of oxygen is adjusted to maintain super-criticality. The formation of thiosulfate is monitored. Optionally, 0.15 M $NaS_2O_3$ may be added as needed.

The output aqueous slurry is subsequently filtered to yield a fine, metal oxide particulate and a clear, light yellow filtrate. Less than 2% arsenopyrite, determined by XRD, remains in the reactor.

Example 2

The process of Example 1 is adapted to feed an equal mixture by weight of arsenopyrite, chalcopyrite, and pyrite with a gold content equivalent of 1 g/ton. The product liquor is a slurry of very fine particles in a yellow solution.

In these examples, the recovery of metal and destruction of the sulfide minerals is well in excess of 95% by wt.

What is claimed is:

1. A method comprising:
oxidizing a metal-containing feedstock in a reactor with liquid and/or supercritical fluid carbon dioxide and at least one oxidant, to obtain a working slurry; and
adding an amount of water to the reactor,
wherein the oxidant is free of a complexing agent and optionally the metal-containing feedstock is not subjected to ultrafine grinding, and
wherein the amount of water used to achieve a water saturation level without excess water is between 0.5 to 10 liters per cubic meter of the working slurry.

2. The method of claim 1, wherein the oxidant is free of complexing agent and the metal-containing feedstock is not subjected to ultrafine grinding.

3. The method of claim 1, wherein the metal-containing feedstock is a mineral metal composition.

4. The method of claim 1, wherein the metal-containing feedstock is a refractory mineral composition.

5. The method of claim 1, wherein the metal-containing feedstock is a mineral metal composition comprising a high sulfide content or a high carbonaceous material content.

6. The method of claim 1, wherein metal-containing feedstock is a waste composition.

7. The method of claim 1, wherein aqueous alkali solution is added to the reactor.

8. The method of claim 1, wherein oxidizing the feedstock is carried out with supercritical fluid carbon dioxide.

9. The method of claim 1, wherein the metal-containing feedstock is fed into the reactor at a temperature below the critical temperature of the carbon dioxide, and an exotherm from an oxidation reaction provides the supercritical temperature.

10. The method of claim 1, wherein the oxidant is added to the reactor at a rate to maintain isothermal conditions in the reactor.

11. A method comprising: oxidizing a metal-containing feedstock in a reactor with liquid and/or supercritical fluid carbon dioxide and at least one oxidant, wherein the oxidant is free of complexing agent and optionally the metal-containing feedstock is not subjected to ultrafine grinding, wherein aqueous alkali solution is added to the reactor.

12. The method of claim 11, wherein the metal-containing feedstock is not subjected to ultrafine grinding.

13. The method of claim 11, wherein the metal-containing feedstock is a mineral metal composition.

14. The method of claim 11, wherein the metal-containing feedstock is a refractory mineral composition.

15. The method of claim 11, wherein the metal-containing feedstock is a mineral metal composition comprising a high sulfide content or a high carbonaceous material content.

16. The method of claim 11, wherein metal-containing feedstock is a waste composition.

17. The method of claim 11, wherein oxidizing the feedstock is carried out with supercritical fluid carbon dioxide.

18. The method of claim 11, wherein the metal-containing feedstock is fed into the reactor at a temperature below the critical temperature of the carbon dioxide, and an exotherm from an oxidation reaction provides the supercritical temperature.

19. The method of claim 11, wherein the oxidant is added to the reactor at a rate to maintain isothermal conditions in the reactor.

20. The method of claim 11, wherein an amount of water used to achieve a water saturation level without excess water is between 0.5 and 10 liters per cubic meter of a working slurry.

* * * * *